United States Patent
Bolotin et al.

(10) Patent No.: US 10,154,020 B1
(45) Date of Patent: Dec. 11, 2018

(54) REFERRAL IDENTITY SYSTEM AND METHOD OF OPERATION THEREOF

(71) Applicant: ClevX, LLC, Kirkland, WA (US)

(72) Inventors: Lev M. Bolotin, Kirkland, WA (US); Alex Lemelev, Maple (CA)

(73) Assignee: ClevX, LLC, Kirkland, WA (US)

( * ) Notice: Subject to any disclaimer, the term of this patent is extended or adjusted under 35 U.S.C. 154(b) by 201 days.

(21) Appl. No.: 15/206,170

(22) Filed: Jul. 8, 2016

Related U.S. Application Data

(60) Provisional application No. 62/190,076, filed on Jul. 8, 2015.

(51) Int. Cl.
*H04L 29/06* (2006.01)
*G06Q 30/02* (2012.01)

(52) U.S. Cl.
CPC ......... *H04L 63/08* (2013.01); *G06Q 30/0214* (2013.01); *H04L 63/068* (2013.01)

(58) Field of Classification Search
CPC ........... G06Q 30/0207; G06Q 30/0209; G06Q 30/0212; G06Q 30/0214; G06Q 30/0221; G06Q 30/0235; G06Q 30/0236; G06Q 30/0239
See application file for complete search history.

(56) References Cited

U.S. PATENT DOCUMENTS

| | | | |
|---|---|---|---|
| 7,069,447 B1 | 6/2006 | Corder | |
| 7,702,536 B1* | 4/2010 | Alabraba | G06Q 30/02 705/14.16 |
| 8,832,440 B2 | 9/2014 | Johnson et al. | |
| 9,075,571 B2 | 7/2015 | Bolotin et al. | |
| 9,262,611 B2 | 2/2016 | Johnson et al. | |
| 2007/0274525 A1* | 11/2007 | Takata | H04L 63/065 380/270 |
| 2008/0065490 A1* | 3/2008 | Novick | G06Q 30/02 705/14.26 |
| 2008/0172649 A1* | 7/2008 | Bisso | G06F 8/65 717/121 |
| 2011/0207497 A1* | 8/2011 | Braiman | H04L 63/068 455/517 |
| 2012/0095822 A1* | 4/2012 | Chiocchi | G06Q 30/0207 705/14.26 |
| 2014/0297382 A1* | 10/2014 | Chiussi | G06Q 30/0225 705/14.26 |
| 2016/0119339 A1 | 4/2016 | Bolotin et al. | |
| 2016/0259736 A1 | 9/2016 | Bolotin et al. | |

* cited by examiner

*Primary Examiner* — Chau Le
(74) *Attorney, Agent, or Firm* — Schwegman Lundberg & Woessner, P.A.

(57) ABSTRACT

Approaches, techniques, and mechanisms are disclosed for providing referral identity systems and services. The referral identity system can provide a hardware based system for identifying users and the devices they are using and recognizing referrals from one device to another and/or from one user to another. Each of the users can be uniquely identified using a device identifier associated with a device that the user is using. The authentication and identity services can be used to license software and/or devices coupled with such software dynamically using integrated hardware, software, and firmware, and provide a validated identification difficult to spoof.

20 Claims, 7 Drawing Sheets

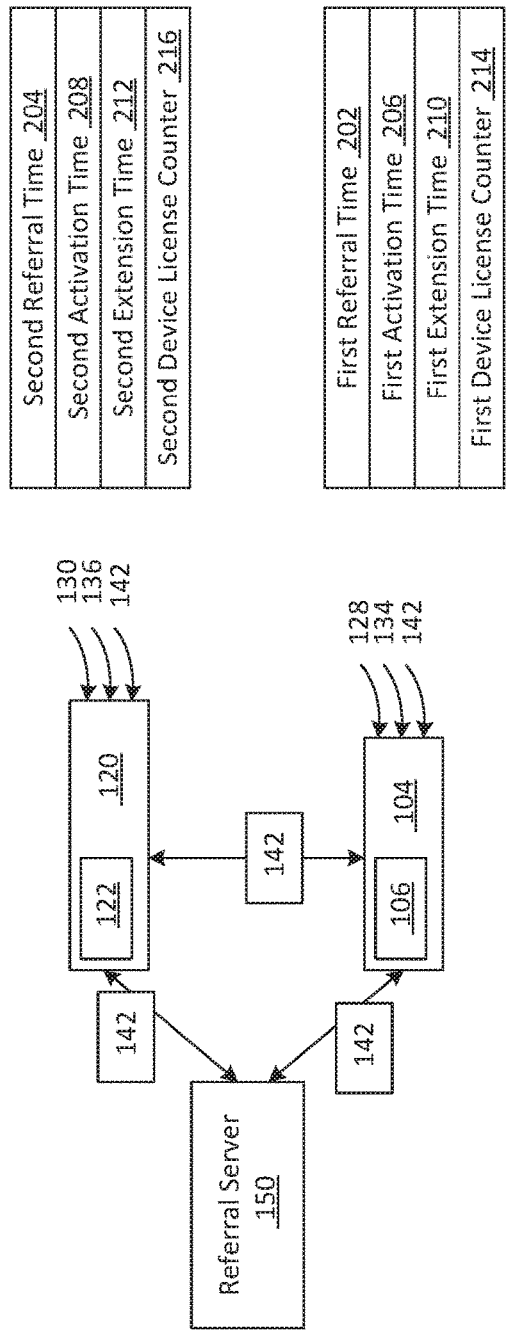
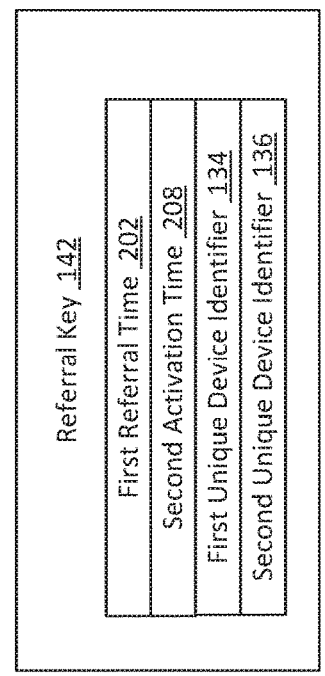
FIG. 2
FIG. 3

702 ⟶

| UDI | UDI Activation Time | Generated Referral Keys | Associated Referral Keys Generation Time | Received Referral Keys | Reward |
|---|---|---|---|---|---|
| 1603 | May 10, 2015 | 1603-A01 | May 11, 2015 | | |
| | | 1603-A02 | May 12, 2015 | | |
| | | 1603-A03 | May 13, 2015 | | |
| | | 1603-A04 | May 14, 2015 | | |
| | | | | | |

| UDI | UDI Activation Time | Generated Referral Keys | Associated Referral Keys Generation Time | Received Referral Keys | Reward |
|---|---|---|---|---|---|
| 1603 | May 10, 2015 | 1603-A01 | May 11, 2015 | | |
| | | 1603-A02 | May 12, 2015 | | |
| | | 1603-A03 | May 13, 2015 | | |
| | | 1603-A04 | May 14, 2015 | | |
| 1604 | May 12, 2015 | | | | |
| | | | | | |

FIG. 8

| UDI | UDI Activation Time T2 | Generated Referral Keys | Associated Referral Keys Generation Time T1 | Received Referral Keys | Reward |
|---|---|---|---|---|---|
| 1603 | May 10, 2015 | 1603-A01 | May 11, 2015 | | +1 month + 25% discounted price |
| | | 1603-A02 | May 12, 2015 | | |
| | | 1603-A03 | May 13, 2015 | | |
| | | 1603-A04 | May 14, 2015 | | |
| 1604 | May 12, 2015 | | | 1603-A01 | +1 month + $5 |

REFERRAL IDENTITY SYSTEM AND METHOD OF OPERATION THEREOF

PRIORITY CLAIM

This application claims benefit of Provisional Application No. 62/190,076, filed Jul. 8, 2015, the entire contents of which is hereby incorporated by reference as if fully set forth herein, under 35 U.S.C. § 119(e).

TECHNICAL FIELD

Embodiments relate generally to electronic devices, and, more specifically, to referral identity devices.

BACKGROUND

Modern consumer devices and software systems use authentication and identification services to validate the identify of users. Often, this is implemented using an account and password system where the user must provide their identity by logging into a system and providing a valid password. In other systems, user may enter a Personal Identification Number (PIN) coupled to an account to authenticate.

Such systems require centralized control and often have access protocol issues that allow the theft of account and password information. In addition, these systems require prior or on-the-spot registration of the account and password information that reduces flexibility. Centralized storage of account and password information can be hacked and identities can be compromised.

Moreover, existing methods and techniques for creating accounts are manual and depend heavily on human interaction of entering unique user information into the software application interface. For example, manual input of account registration information is cumbersome, time consuming, prone to errors, often requires service and support phone calls, which causes consumers to avoid the process all together.

Additionally, as advertisement, loyalty, and reward systems proliferate to mobile applications and solutions, problems with user identity and system abuse will grow. Consumers can easily set up multiple accounts by using free email accounts and different phone numbers. Verification of the actual user becomes difficult when the system also desires to be consumer friendly and non-intrusive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 depicts an example of a referral server.

FIG. 3 depicts an example of the referral key.

FIG. 7 depicts a first example of a referral database table.

FIG. 8 depicts a second example of the referral database table.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
2.1. Miscellaneous
3.0. Functional Overview
4.0. Example Embodiments
5.0. Implementation Mechanism—Hardware Overview
6.0. Extensions and Alternatives

1.0. GENERAL OVERVIEW

Approaches, techniques, and mechanisms are disclosed for providing referral identity systems and services. The referral identity system can provide a hardware based system for identifying users and the devices they are using and recognizing referrals from one device to another and/or from one user to another. Each of the users can be uniquely identified using a device identifier associated with a device that the user is using. The authentication and identity services can be used to license software and/or devices couple with such software dynamically using integrated hardware, software, and firmware, and provide a validated identification difficult to spoof.

The referral identity system can support a variety of reward systems to give an incentive to users to run applications, including running on the integrated hardware and software systems and devices such as Smart TVs, internet appliances, network connected modem, Internet of Things (IoT) based thermostats, home security monitoring camera, etc. The referral identity system can be used to pass referrals for use of such applications, devices, and systems to other users. The system can also provide a license control mechanism that can be used to modify existing license based on the number of referrals.

According to one embodiment, the referral identity system can generate a referral key associated with a device identifier and a referral time.

According to another embodiment, a second user can receive the referral key from a first user. The second user can use the referral key to activate a license. By comparing referral and activation timestamps, the system can control license functionality and limit the number of copies of a particular license.

In other aspects, the invention encompasses computer apparatuses and computer-readable media configured to carry out the foregoing techniques.

2.0. STRUCTURAL OVERVIEW

Figure 1:
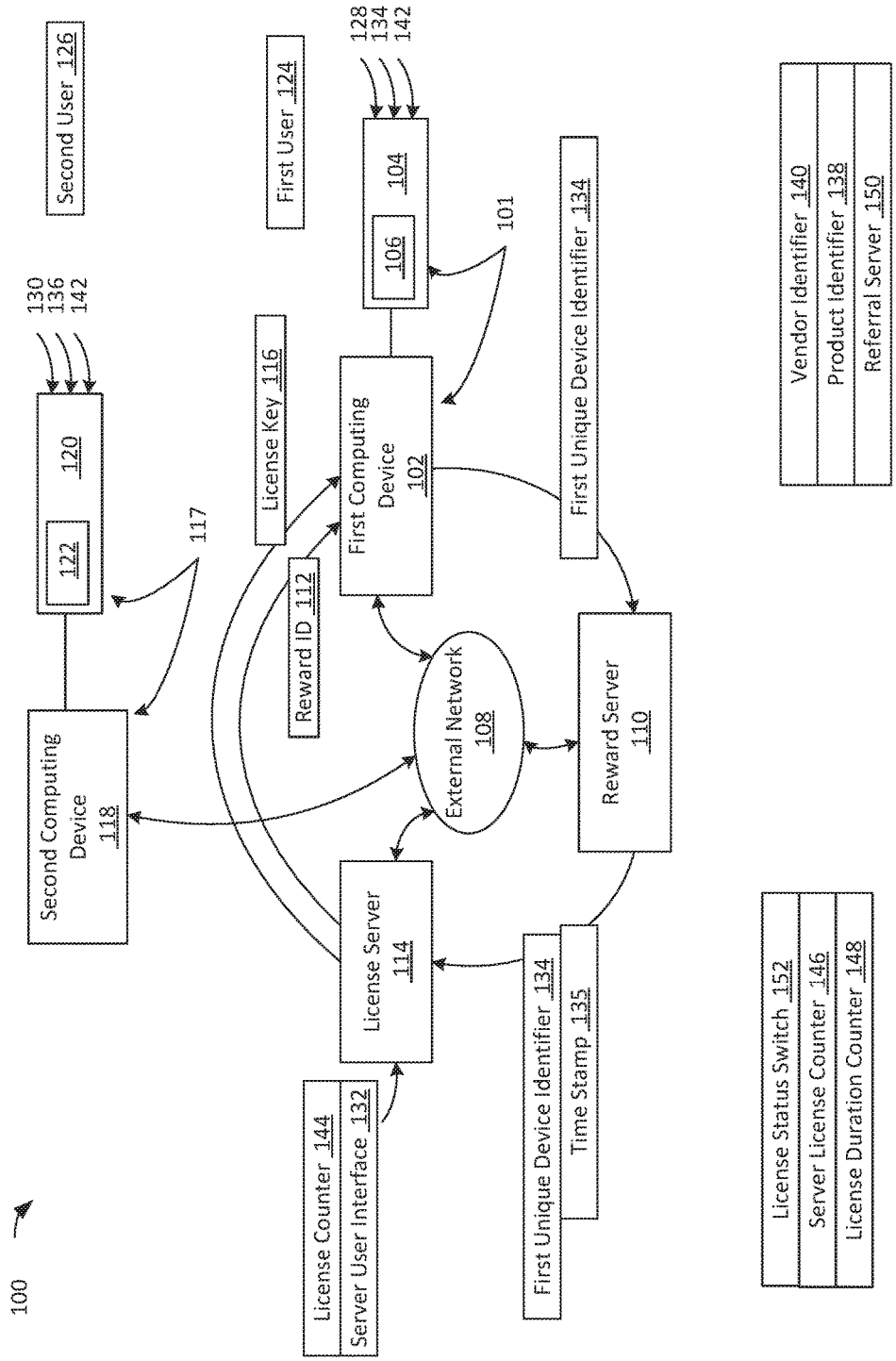
FIG. 1 depicts a referral identity system in a first embodiment.

Referring now to FIG. 1, therein is shown a referral identity system 100 in a first embodiment. The referral identity system 100 can allow a device to self-authenticate, generate referrals, transfer referrals, and provide rewards to referrals.

The referral identity system 100 can include a first computing device 102 communicatively coupled to a referral server 150, such as a license server 114 and/or a reward server 110, via an external network 108, such as the Internet. Coupling is defined as having a communicative linkage or connection between the two elements. Coupling can include a direct physical connection, a logical connection, a wired connection, a wireless connection, or other type of connectivity between the elements.

In an illustrative example, the first computing device 102 can be connected to a first removable media device 104 having a first application 106 on the device. The first computing device 102 can be a computer, laptop, controller, intelligent device, tablet computer, smart phone, IoT device, or other computing devices.

The removable media device can be a memory storage device. The removable media device, such as the first removable media device 102 or a second removable media device 120, can be a Universal Serial Bus (USB) flash memory stick, an active device with a flash memory, a disk drive, an optical storage unit, or other memory unit.

The combination of the first computing device 102 and the first removable media device 104 can be a first network connected device 101. The first network connected device 101 can have all of the properties of combination of the first computing device 102 and the first removable media device 104. The first network connected device can have a first unique device identifier 134. Similarly, a second computing device 118 and a second removable media device 120 can be a second network connected device 117 having similar properties. For example, the first network connected device 101 can be a media device, a Smart TV, internet appliances, network connected modem, IoT device, network connected thermostat, home security device, or similar network connected device.

In another example, the first network connected device 101 can have the first removable media device 104 as a fixed memory unit directed installed within the first computing device 102 and not removable. The first unique device identifier 134 can be associated with the first network connected device 101.

In a further example, the second network connected device 117 can have the second removable media device 120 as a fixed memory unit directed installed within the second computing device 118 and not removable. The second unique device identifier 136 can be associated with the second network connected device 117.

The reward server 110 is a computing device available over the Internet where rewards are tracked for users based on the device identifier of the removable media devices, such as the first removable media device 104 or the second removable media device 120. The rewards can be one-sided or both-sided incentive units of different types to reward the user of the removable media device, IoT device, mobile media device, Smart TV, or similar network connected devices. The rewards can be identified with a reward identifier 112. The reward identifier 112 is a value for uniquely identifying the reward.

The license server 114 is a computing device available over the Internet where information about licenses can be stored. For example, a software license server can provide license keys to client computing devices to enable licensed software to run. The license server 114 can receive the first unique device identifier 134 and a time stamp 135 from the reward server 110 or the first computing device 102.

In an illustrative example, the referral identify system 100 can include inactivated or deactivated software, which can be provided as a time-limited trial offer that needs to be activated. The inactivated software or its package can include a license key 116. The license key 116 can be an encoded unique sequence of alphanumeric characters, which can be purchased and used to activate the software. The license key 116, also known as a software key, product key, activation key, or some other unique product associated number, is a specific software-based key for a computer program that can be used to activate such computer programs or applications. Alternatively, the inactivated software product can be embedded within the hardware device, such as an IoT device, or seeded by the unique identifiers of the hardware device like a Smart TV, internet appliances, or other similar devices.

The license key 116 can be used to certify that the copy of the program is original and authentic and valid to the software developers, or publisher, or other stakeholders. The activation of the software can sometimes be performed offline by entering the license key 116. Alternatively, the system can include online activation, which can prevent multiple people using the license key 116.

The license key 116 may consist of a series of numbers and/or letters. This sequence is typically entered by the user during the installation of computer software, and is then passed to a verification function in the program. This function manipulates the license key sequence according to a mathematical algorithm and attempts to match the results to a set of valid solutions. The license key 116 can be used to activate the software indefinitely, for a specific time period, for an additional time duration from the current time, or for a number of uses, users, or a combination thereof.

The referral identity system 100 provides a method of referrals based on device identity e.g. using a hardware device identifier, such as the first unique device identifier 134 (UDI), that can include a hardware unique serial number. For example, a first user 124 generates and sends a referral key 142 to a second user 126 having the second computing device 118 and as a result of the referral, this second party has purchased the second removable media device 120 that may have a second application 122 on it. The second application 122 has similar functionality as the first application 106. In some variations, the reward server 110 and the license server 114 can reside on the same physical server, computer, or cluster of computers at the same hosting facility. The reward server 110 and the license server 114 can be located at different locations and facilities and network connect to enable their communication.

The first computing device 102 can be computing device connected to a network and coupled to the first removable media device 104. The first removable media device 104 is communicatively coupled to the first computing device 102 by connecting the first removable media device 104 to the first computing device 102 such that the content of the first removable media device 104 are accessible to the first computing device 102 and can be executed from the first removable media device 104. The connection can be wired or wireless, logical or physical, or a combination thereof.

The first removable media device 104 can include applications and media items. The first removable media device 104 can include the first application 106. The first application 106 can be activated when the first removable media device 104 is coupled to the first computing device 102. The first application 106 can be a security application for initiating referrals from the device. For example, after activation, the first application 106 can send a referral request to one of the referral servers. The first application 106 can also provide other functionality including providing an interactive user interface, communication between devices and servers, messaging, or a combination thereof.

In another example, the first application 106 can execute on the first computing device 102 and send the referral key 142 to the license server 114. The license server 114 can validate the referral key 142 and prepare a license key 116. The license key 116 can be send to the same or another device to grant the license. In particular, the license key 116 can be sent to another device when it requests the license and uses the same referral key 142. The referral identity system 100 can allow the granting of a reward to the first network connected device 101 with a license extension, unlocking additional features, or providing other kinds of reward equivalent to the first user that initiated the referral. The rewards can include cash, cash-like gift cards, discounts for future purchases, bonuses, or a combination thereof. The rewards can be granted after a referral was sent, after a second network device 117 was granted a license, or a combination thereof.

The system can include a license counter, such as a server license counter 144 or an application license counter 146, for tracking the number of times a license has been issued by the license server 114. The server license counter 144 can be implemented as a storage valued on the license server 114 that is incremented when a new license key 116 is issued. Each different license can have a separate server license counter 144. The server license counter 144 can be a single value, an array value, a matrix value, a database table entry, or a combination thereof.

For example, the license counter may be a sub-component of the first application 106 that is installed from the first removable media device 104. In another example, the license counter may be updated when redeeming the rewards gained as a result of providing the referrals.

The first removable media device 104 can have a first unique device identifier 134 to establish the identity of the device. Each media device can have a separate instance of the unique device identifiers. The first unique device identifier 134 can be used to uniquely identify the device and can be used to link referrals from one device to another and across different kinds of applications and devices. For example, the unique device identifiers can be a serial number or other identifying value.

The unique device identifier, such as the first unique device identifier 134 or the second unique device identifier 136, can be combined with a product identifier 138 and/or a vendor identifier 140 to uniquely identify the device and is part of the manufacturing process. The first unique device identifier can include other values such as an Ethernet device media access control (MAC address), a Bluetooth address (BD_ADDR), or other similar hardware identifiers.

The vendor identifier 140 is a value used to identify the vendor or manufacturer of the removable media devices. For example, the vendor identifier 140 can be the Vendor ID as provided by the USB Implementers Forum.

The product identifier 138 is a value used to identify a particular product type or model of a device. The product identifier 138 can be assigned and maintained by the vendor. The product identifiers can be used to distinguish between different products, stocking keeping units (SKU), or parts from a single vendor. Additionally, a revision value can be used to distinguish between multiple devices which have the same values for the vendor identifier 140 and the product identifier 138.

The referral identity system 100 can interoperate between the first removable media device 104 and the second removable media device 120. The referral identity system 100 can include the second computing device 118 for coupling with the second removable media device 120 having the second application 122. The second computing device 118 can be coupled to the external networks 108. The second removable media device 120 has the second unique device identifier 136. It is understood that removable media device is used here as an example only and the same or other methods and systems can be used for any other network-connected hardware devices with integrated software applications to allow them to send a referral from the device and linking referral keys between devices and applications and for redeeming the referral rewards.

The referral server 150, such as the license server 114 and the reward server 110, can provide users with a server user interface 132, which a user may use to interact with the referral servers. For example, users can select a product or service for discounts. Successfully redeeming the rewards may also entail processing a payment, which includes receiving from a user an electronic payment using either a credit card or other electronic payment method. For example, PayPal, gift cards, or the like can be used to pay for the discounted product or service that was selected as part of the reward redemption process.

The referral server 150 can receive the first unique device identifier 134 and the referral key 142 associated with it from the first application 106. The record of the transaction can be stored in a file, database, or in memory. Thus, the first unique device identifier 134 and the referral key 142 are uniquely bound to a specific removable media device, such as the first removable media device 104.

In one example, the license server 114 can store the time and date of software activation for a licensed application or integrated hardware device with an application and starts a license duration counter 148 that will count the duration of the license validity. Thus, if the associated license is valid for 1 year, then 12 months from the date of activation of the software, the license will expire when the license duration counter 148 indicates the time and date have reached the duration limit.

In another example, the license server 114 can send commands and licenses to the first application 106 on the first removable media device 104 or the second application on the second removable media device 120. These commands can include system security features including the ability to control the activation and execution of software applications.

For example, the commands can toggle a license status switch 152 in the software application such that when this switch is in the off position the software application is in an unlicensed or inactivated state. The commands can also include a switch to the on position, where the software app is in a licensed or activated state. Alternatively, the switch can be used to lock and unlock additional feature of the product, change license durations, or other similar functions.

Such a software switch or software command may be operated by having a variable that can be toggled between "0" and "1" by receiving instructions from the software or integrated device vendor. Thus, a series of successful referrals may be enough for the license server 114 to send a command/instructions to the software to toggle the switch from a "0" to a "1" and provide a limited or unlimited duration of software license as a reward. In one embodiment, the preloaded software of the removable media device may show a license activation confirmation message or a confirmation symbol depicting an activated license or both, along with the license duration, the name of the person/ company to whom this license key is assigned, the device identifier, or a combination thereof.

The software applications can be implemented in a variety of configuration. For example, the software applications can operate in a standalone configuration or in combination with other software programs and is not limited to any particular operating system or programming paradigm described here. The software applications can be integrated in the network connected hardware devices or run from removable media devices on a computing device connected to the network.

The software applications can be executed by a processor or a control unit. The processor or control unit can be housed on the removable device or the electronic device that is connected to the removable device such as a smart TV, personal computer, or internet appliance, or internet provider modem, or similar devices. The software applications can include a user interface for presenting graphics and text to users and can be compatible with a touch-screen interface.

The referral media identity system 100 is a hardware and software system for providing a unique identifier that can be used in a variety of referral systems and programs. The unique identifier, such as the first unique device identifier 134, is tied to a specific hardware device, such as the first removable media device 104 or the second removable media device 120. The unique identifier is tied to the hardware properties of the hardware device and can be associated with the referral key 142 for a referral for that particular device.

Further, the software of the identity system is securely tied to the specific hardware device to prevent hacking, false identification, and abuse of the referral system. It has been discovered that the required connection, coupling, or association between the removable media device and the software application significantly improves verification by providing a system that is difficult to hack and is difficult to create false identities. The ability to identify a user based on a detected connection to the removable media device improves security. These secure features streamline online verification and present significant improvements to the field of user authentication and application tamper-proofing.

It has been found that the referral identity device system provides authentication and verification for referral and rewards systems, while providing solutions to problems of ever-increasing complexity of technology along with growing consumer expectations for simplified products.

Referring now to FIG. 2, therein is shown an example of a referral server 150. The referral server 150 can receive the referral key 142 from the first removable media device 104 and the referral key 142 from the second removable media device 120 to process the referral key 142 to validate the referral. The referral server 150 can include the license server 114 of FIG. 1, the reward server 110 of FIG. 1, or a similar server in the system.

The first removable media device 104 can be coupled to the first computing device 102 of FIG. 1. Coupling includes forming a linkage, association, or connection, both logical or physical, with the two elements. The first application 106 can execute on the first computing device 102 to generate the referral key 142. The first application 106 can be controlled using a first user interface 128.

The applications, such as the first application 106 or the second application 120, can generate the referral key 142 in a variety of ways. For example, the referral key 142 can be calculated locally, retrieved from the referral server, looked up in a table, or a combination thereof. The application can have a user interface allowing sending a referral built-in or can be invoked using a web-based referral page as part of such applications. The referral key 142 is an alphanumeric sequence of characters. The referral key 142 is the unique identifier of the referral transaction. The referral transaction is the linking of two devices based on the referral information including the time stamp of the sending referral and its acceptance, product authenticity verification, matching referral keys, or a combination thereof, from one to the other.

For example, the first application 106 can send the referral key 142 along with the first unique device identifier 134 of the first removable media device 104 and the first referral time 202 to the referral server 150 and to the second removable media device 120, which is coupled to the second computing device 118 of FIG. 1. The referral key 142 can be linked to the first unique device identifier 134 and the first referral time 202 by creating a data entry in a data structure or database where the referral key 142, the first unique device identifier 134, and the first referral time 202 are logically connected, associated, or related to one another.

The second application 122 can execute on the second computing device 118. The second application 122 can receive the referral key 142 from the first application 106. The second application 122 can then send the referral key 142 along with the second unique device identifier 136 and the second activation time 208 to the referral server 150. The referral key 142 is linked to the second unique device identifier 136 and the second activation time 208. Linking can include creating a data entry in a data structure or database where the referral key 142, the second unique device identifier 136, and the second activation time 208 are logically connected, associated, or related to one another.

The second application 122 can be controlled using a second user interface 130. The referral key 142 can be linked to the second unique device identifier 136 and the second activation time 208 and stored in a database or other memory storage system. Matching the referral key 142 and other data from each of the devices can form the referral transaction. The referral key 142 is linked to the second unique device identifier 136 and the second activation time 208 by creating a data entry in a data structure or database where the referral key 142, the second unique device identifier 136, and the second activation time 208 are logically connected, associated, or related to one another.

The referral server 150 can compare the first referral time 202 to the second activation time 208 to validate the referral. If the first referral time 202 is less than the second activation time 208, then the referral operation is valid. If not, then the referral operation is invalid.

In an illustrative example, if the referral operation is valid, then the referral server 150, such as the license server 114 can send the license key 116 of FIG. 1 to the second application 122 to extend a software license by a second extension time 212. The issuing of the license key 116 can increment a first device license counter 214, a second device license counter 216, or a combination thereof. The license key 116 can also be used to extend a first extension time 210 on the first computing device 102. In a related example, if the referral operation is valid, then the system can implement a double-sided referral program where both parties get rewarded and the license key 116 can be sent to both parties or some other reward.

Although the first referral time 202 and the second activation time 208 are used in the examples above, it is understood that if the referral operation were to go in the direction from the second application 122 to the first application 106, then a second referral time 204 of the second removable media device 120 and a first activation time 206 of the first removable media device 104 can be used.

Referring now to FIG. 3, therein is shown an example of the referral key 142. The referral key 142 can be used to identify a referral transaction between two or more devices.

Although the referral key 142 is described as an alphanumeric string, the referral key 142 can be represented using a simple data type or a complex data type having multiple elements. For example, the referral key 142 can be an array include the first referral time 202, the second activation time 208, the first unique device identifier 134, and the second unique device identifier 136. It is understood that regardless of the representative data structure, the referral key 142 includes the alphanumeric string to uniquely identify the referral transactions between devices.

The first referral time 202 is when the referral key 142 was used to create a referral. The second activation time 208 is when a user tried to request a software license activation or otherwise request that the referral be validated by the server.

Figures 4, 5, 6:
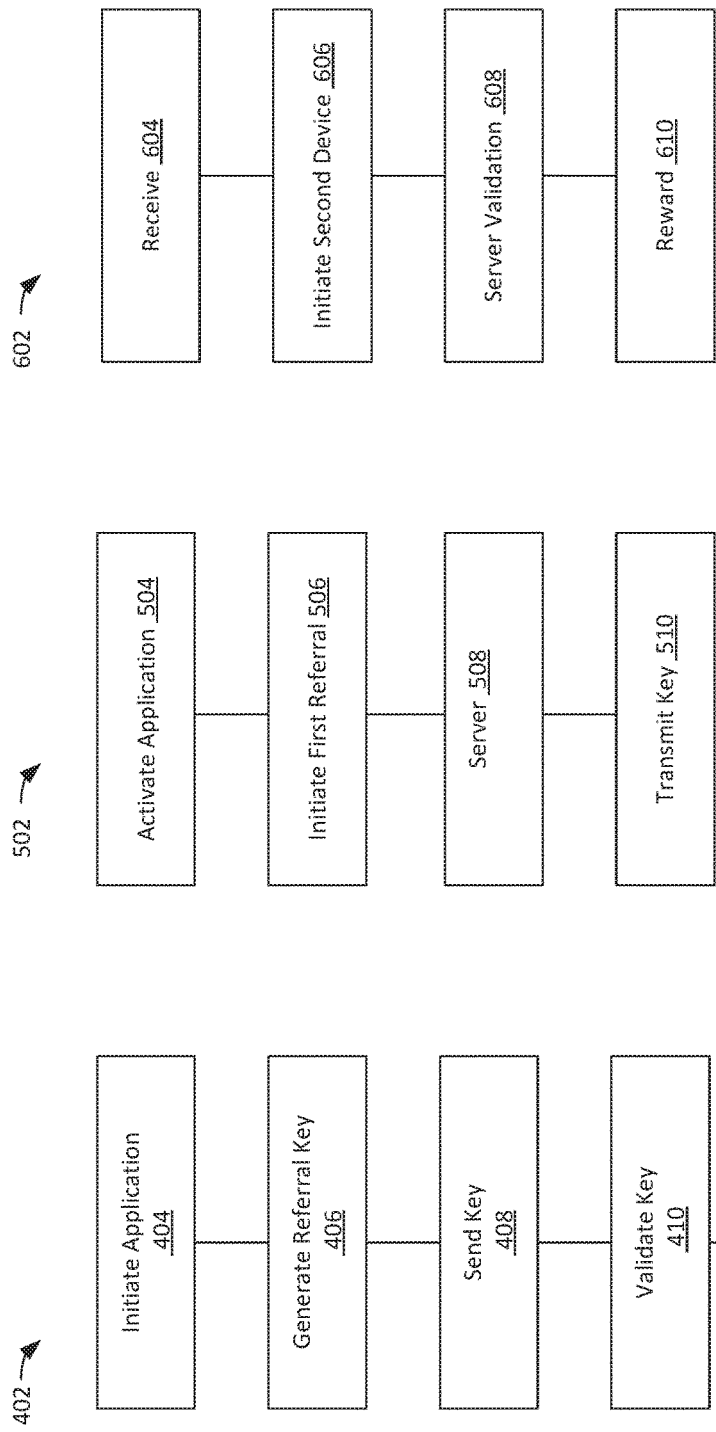
FIG. 4 depicts an example of a referral data process.
FIG. 5 depicts an example of an extract process flow.
FIG. 6 depicts an example of a reward process flow.

Referring now to FIG. 4, therein is shown an example of a referral data process 402. The referral data process 402 can generate the referral key 142 of FIG. 1 for a transaction without the need for a user account.

The referral data process 402 provides a way to generate referrals based on the device identify of the first removable media device 104 of FIG. 1 and the second removable media device 120 of FIG. 1. Both devices can participate in the referral transaction. It is understood that removable media device is used here as an example only and the same or other methods and systems can be used for any other network-connected hardware devices with integrated software applications to allow them to send a referral from the device and linking referral keys between devices and applications and for redeeming the referral rewards.

The referral data process 402 does not require that a customer create an account. Instead, the first unique device identifier 134 of FIG. 1 of the device is used as a mechanism to link the rewards associated with the users. Since the rewards are tied to the unique device identifier of a given device, such as the first removable media device 104 or the second removable media device 120, it has been found that a user cannot create multiple accounts for collecting multiple sets of rewards. Additionally, the referral data process provides for a secure system and method for providing referrals as the identity of a real device is used which cannot be easily duplicated, shared or hacked.

The referral data process 402 can be implemented in a variety of ways. For example, the referral data process 402 can include an initiate application module 404, a generate referral key module 406, a send key module 408, a validate key module 410, and an extend license module 412.

The initiate application module 404 can allow the first removable media device 104 to be connected to the first computing device 102 of FIG. 1. The first application 106 of FIG. 1 can be manually or automatically executed. The first application 106 can optionally provide the first user interface 128 of FIG. 1 to interact with the user. The first application 106 can provide a mechanism for a user to purchase a license, send referrals, extend a license, or similar operations.

Linking of the software with an integrated hardware connection provides improvements to accurate verification of a device identity and can prevent system abuse. As a security feature, the software can require a connection, such as the connection between the removable media device, a network connected device, and the computing device before enabling access to the device or directly between an internet appliance device, Smart TV, IoT device, or other similar device and the referral servers.

The referral data process 402 uses removable media device as an example of a hardware/physical product linkage to illustrate the functionality of the referral identity system 100 of FIG. 1. However, it is understood that any hardware or physical device that can either be networked to access the Internet directly or connected to another device that is networked to gain access to the Internet. Thus, many different types of devices that can either connect directly to the Internet. For example, the system can use SmartTVs, network routers, thermostats, smart appliances, microwave ovens, refrigerators, washing machines, dish washers, or devices that can connect to another device to gain access to the internet. The system can use USB drives with portable applications, external accessories such as heart rate monitor, blood pressure monitor, IoT device, or other similar device.

The initiate application module 404 initiate the referral process manually or automatically. In the automatic mode, the first application 106 can execute on the first computing device 102 upon connection. After the start of execution, the first application 106 can initial the referral process. In the manual mode, the first application can display the first user interface 128 having a referral button or other control to allow the user to initiate the referral process by activating on the control. For example, the user can click on the referral button. After completion, the control flow can pass to the generate referral key module 406.

The generate referral key module 406 can generate the referral key 142 associated with the first unique device identifier 134 of the first removable media device 104 and create the time stamp 135 of FIG. 1, such as a first referral time 202 of FIG. 2.

The referral key 142 can be generated in a variety of ways. For example, the referral key 142 can be calculated on the first computing device 104, retrieved from the referral server 150 of FIG. 1, looked up from a data table in the one of the removable media devices, or other similar techniques. The referral key 142 can be represented in a hierarchical data structure having multiple related data elements.

The generate referral key module 406 of the first application 106 can extract the first unique device identifier 134 from the first removable media device 104, such as a USB storage device or the computing device. The first unique device identifier 134 can identify the device associated with the referral key 142.

In yet another example, the referral key 142 can be associated with the first unique device identifier 134 from the first removable media device 104. The first unique device identifier 134 of the first removable media device 104 can include device specific information such as the device serial number combined with product identifier 138 of FIG. 1 and the vendor identifier 140 of FIG. 1. Each of the referral keys 142 can be associated with one or more of the unique device identifier of the unique devices involved in a referral.

The unique device identifiers can have a variety of configurations. For example, one of the device may only have a one of the unique device identifiers, such as the first unique device identifier 134. In another example, each of the unique device identifiers can have several unique referral keys associated with it. Associating the referral key 142 with the unique device identifier of a hardware device is more tamperproof because the unique device identifier of the hardware is required to perform the referral transaction. This additional layer of security reduces false identification verifications and abuse to referral systems. After completion, the control flow can pass to the send key module 408.

The send key module 408 can pass the referral key 142 to another user or device. For example, the send key module 408 can transfer the referral key 142 to the second removable media device 120.

The send key module 408 can transfer the referral key 142 of the first application 106 manually by first displaying the referral key 142 in the first user interface 128. The referral key 142 may be a combination of alphanumeric characters and or special characters that can be copied and transferred to another system. For example, the referral key 142 may have a given character sequence. In another example, the referral key 142 can be based on random sequences of alphanumeric or special characters.

After the referral key 142 has been displayed, the first user 124 of FIG. 1 can transfer the referral key 142 to the second user 126 of FIG. 1 having the second removable media device 120. The referral key 142 can be transferred in a variety of ways including via e-mail, text message, physical transfer, copying, etc.

As an illustrative example, the first user 124 can transfer the referral key 142 to the second user 126 having the second removable media device 120 by copying and pasting the referral key 142 from the user interface of the first application 106 and pasting it in an e-mail or a text message; or printing the unique referral key on paper and sending that to the second user 126.

The second user 126 can receive the referral key 142 sent by the first user 124 manually and enter the referral key 142 in the second user interface 130 of FIG. 1 of the second application 122 of FIG. 1. The second application 122 can store the referral key 142 sent by the first user 124 in the second removable media device 120. Alternatively, the referral key 142 can be sent electronically and automatically entered into the second application 122.

The referral key 142 can be associated with a time-stamp to indicate the activation time by the second user 126 and sent to the referral server 150. The referral key 142 can be transferred to the server, such as the license server 114 of FIG. 1 or the reward server 110 of FIG. 1, together with the second unique device identifier 136 of FIG. 1 and the activation time, such as the second activation time 208 of FIG. 2. The second activation time 208 is the time the second application 122 was activated. For example, the second activation time 208 can be the time the second user 126 clicked on a user control element of the second user interface 130, such as a button. After the referral key 142 has been received, the control flow can pass to the validate key module 410.

The validate key module 410 receives the referral key 142 at the server and validates the referral request. The validate key module 410 can receive the referral key 142 and compare the first referral time with the second activation time 208 to determine the validity of the referral request.

To validate the referral key 142, the referral server 150 compares the time when the referral key 142 was generated, such as the first referral time 202, with the time the second removable media device 120 was activated, such as the second activation time 208. The terms first and second are generally used to distinguish similar values for the first user 124 and the second user 126.

If the first referral time 202 is earlier than the second activation time 208, then the referral key 142 was valid and the system can reward the first user 124 having the first removable media device 104. For example, the system can reward the first user 124 by extending the license by a given period of time.

If the first referral time 202 is later than the second activation time 208, then the referral key 142 Is not valid and no reward can be awarded. If the first referral time 202 is later than the second activation time 208, it shows that the referral action from the first user 124 occurred after the referral request of the second user 126.

The system can have different reward systems. For example, for each referred customer who actives a device the referring customer gets a one-month extension of license, or is given points that can be redeemed for other products or services or an ordinary membership is upgraded to a premium membership, or discounts that can be applied to services and products or free offers e.g. download a free movie or a free song etc. In another example, the reward may be implemented using a double-sided referral program, where both referrers the referred parties get rewarded.

Referring now to FIG. 5, therein is shown an extraction process flow 502. The extraction process flow 502 can extract the unique device identifier, such as the first unique device identifier 134 of FIG. 1, from, for example, the first removable media device 104 of FIG. 1.

The extraction process flow 502 can retrieve the first unique device identifier 134 from the first removable media device 104. The extraction process flow 502 can include an activate application module 504, an initiate first referral module 506, a server module 508, and a transmit key module 510.

The activate application module 504 can be initiated when the first user 124 of FIG. 1 connects the first removable media device 104 to the first computing device 102 of FIG. 1 and the first application 106 software on the first removable media device 104 executes. In one example, the first application 106 of FIG. 1 can execute from the first removable media device 104 and provides the first user interface 128 of FIG. 1.

The first user 124 can interact with the different functionality of the first application 106. For example, the first application 106 can include a function for a user to purchase a license, a function for a user to send referrals etc. After completion, the control flow can pass to the initiate first referral module 506.

The initiate first referral module 506 can initiate the referral process. For example, the first application 106 can display the first user interface 128 that the first user 124 may use to initiate the referral process.

The first user interface 128 can include a referral button to facilitate the process. The referral button can be labelled "Referral", "Refer Friend", or other descriptive text. The first user 124 can select and activate the referral button to initiate the referral process and generate the referral key 142 of FIG. 1. The referral key 142 is associated with the first unique device identifier 134 of the first removable media device 104 and can include a time stamp with the first referral time 202 of FIG. 2. The referral key 142 can be linked to the first unique device identifier 134 and the first referral time 202 by storing the data together. Linking can include creating a data entry in a data structure or database where the referral key 142, the first unique device identifier 134, and the referral time 202 are logically connected, associated, or related to one another. The first referral time 202 can be the time the referral process was initiated by pressing the referral button. Generating the referral key 142 can be done by calculating it locally, retrieving it the referral server 150 of FIG. 1, looking it up in a data table, or a combination thereof.

In one example, the unique referral key 142 may be generated by the referral server 150. The first application 106 can perform a network call to the referral server 150 and retrieve the referral key 142. In another example, the first application 106 can calculate or look up the referral key 142.

Each unique referral key 142 is tied to a unique first unique device identifier 134. The first removable media device 104 can only have one first unique device identifier 134 whereas each first unique device identifier 134 may have several unique referral keys 142 associated with it. After completion, the control flow can pass to the server module 508.

The server module 508 can validate the referral key 142. The initiate first referral module 506 of the first application 106 sends the newly generated referral key 142 to the referral server 150, such as the license server 114 of FIG. 1 or the reward server 110 of FIG. 1, along with the first unique device identifier 134 of the first removable media device 104. The first user 124 may generate one or more unique referral keys 142, thus one first unique device identifier 134 may have one or more referral key 142s associated with it.

The server stores the referral key 142 and the associated first unique device identifier 134 in a database. The referral key 142 can receive a timestamp, such as the firsts referral time 202, either from the referral server or from the first application 106. In one example, the server stores the referral key 142 and the associated first unique device identifier 134 of the first removable media device 104 from where the referral key 142 was generated in a database and time stamps it with first referral time 202. After completion, the control flow can pass to the transmit key module 510.

In the transmit key module 510, the referral key 142 of the first removable media device 104 can be transmitted to the second removable media device 120 of FIG. 1 of the second user 126 of FIG. 1. The transfer can occur manually or automatically.

The first application 106 can display the newly generated referral key 142 in the first user interface 128. The newly generated referral key 142 may be a combination of alphanumeric characters and or special characters. In some examples, the newly generated referral key 142 may have a given sequence or pattern while in other examples, the newly generated referral key 142 may be based on random sequences of alphanumeric and/or special characters.

The first application 106 allows the first user 124 to transmit the referral key 142 to the second user 126. The referral key 142 can be transmitted via e-mail, text message, copying, or verbally. For example, the first user 124 transmits the referral key 142 to the second user by copying the unique referral key 142 from the first user interface 128 of the first application 106 and pasting it in an e-mail or a text message; or printing the unique referral key 142 on paper and giving that to a second user 126.

The transmit key module 510 can display the referral key 142 and send the referral key 142 to the second user 126. For example, the transmit key module 510 can display the referral key 142 in the user interface. After displaying the referral key 142, the first user 124 can send the referral key 142 to the second user 126 vi email, text message, verbal message, or other transmission techniques.

Referring now to FIG. 6, therein is shown a reward process flow 602. The reward process flow 602 can validate the referral key 142 of FIG. 1 and the timestamps to determine if the referral is valid.

The reward process flow 602 can be implemented in a variety of ways. For example, the reward process flow 602 can include a receive module 604, an initiate second device module 606, a server validation module 608, and a reward module 610.

The receive module 604 can receive the referral key 142 from the first user 124 of FIG. 1 and store it in the second removable media device 120 of FIG. 1. The second removable media device 120 can receive the referral key 142 via a text message, an email, or directly entered in the second user interface 130 of FIG. 1. Alternatively, the referral key 142 can be received from the first removable media device 104 of FIG. 1 over the external network 108 of FIG. 1, directly stored in the memory of the second removable media device 120, or other electronic techniques.

The second removable media device 120 can be acquired by the second user 126 of FIG. 1 in a variety of ways. In an illustrative example, the second user 126 can acquire the second removable media device 120 from a retail store or an online store. Alternatively, the second user 126 may receive the second removable media device 120 as a gift, a content prize, a lottery, or some other way. After receiving the referral key 142, the control flow can pass to the initiate second device module 606.

The initiate second device module 606 can process the referral key 142. The second removable media device 120 can be connected to the second computing device 118 of FIG. 1 that is coupled to the external network 108. The second user can launch the second application 122 of the second removable media device 120. The second application 122 of FIG. 1 can be responsible for interacting the second user 126 and the servers.

The second application 122 can send the referral key 142 to the referral server 150 of FIG. 1, such as the license server 114 of FIG. 1 or the reward server 110 of FIG. 1, along with the second unique device identifier 136 of FIG. 1 and the second activation time 208 of FIG. 2. The second application 122 can append the second activation time 208 and the second unique device identifier 136 of the second removable media device 120 to the referral and send the updated referral key 142 to the server. The activation actions can take place when the second user 126 activates a user control, such as a button. After completion, the control flow can pass to the server validation module 608.

The server validation module 608 can determine if the referral key 142 identifies a valid referral by comparing the first referral time 202 of FIG. 1 with the second activation time 208. The server compares the time when the referral key 142, the first referral time 202, was generated with the time the second removable media device 120 was activated, the second activation time 208.

If the first referral time 202 is less than the second activation time 208, which implies that the referral key 142 was generated by the first user before the second removable media device 120 was activated. This represent a valid referral and the system can record a reward for the first removable media device 104 of the first user 124 and/or second removable media device 120 of the second user 126. For example, if the valid reward is detected, the system can extend the license period for a piece of software on one or both of the removable media devices by a given period of time.

If the first referral time 202 is greater than the second activation time 208 then this implies that the referral key 142 was generated by the first user 124 after the second removable media device 120 was already activated and thus an improper referral was performed. This implies that the second user 126 knew about or had access to the target application 512 of FIG. 5 before the first user 124 had generated the referral key 142.

After comparing the two time values, the control flow can pass to the reward module 610. The reward module 610 can process the reward for a successful referral. For example, the reward for the license server 114 can be the grant of the license key 116 of FIG. 1.

In an illustrative example, a target application 512 or other software applications may be bundled with a removable media e.g. the second removable media device 120. The target software application may be in an inactivated state providing a user with a trial period with an option to purchase a license to fully activate it.

The second user 126 can receive the referral key 142 from the first user 124 and send the referral key 142 with the second unique device identifier 136 and the second activation time 208 to the license server 114. If the referral key 142 is validated, then the license server 114 can send the license key 116 to the second application 122 which can then apply the license key 116 to the target application and allow it to execute according to the parameters of the license key 116.

Although described in terms of the license server 114, it is understood that other types of referral-based servers can be used with the referral identity system 100 of FIG. 1. For example, the license server 114 can be replaced with the reward server 110 for enabling rewards based the referral key 142 being validated.

Referring now to FIG. 7, therein is shown a first example of a referral database table 702. The referral database table 702 can be managed by the application, such as the first application 106 of FIG. 1 or the second application 122 of FIG. 1. The referral database table 702 can include entries of referral activities. The referral database table 702 can include columns for a recording of the unique device identifiers, the unique device identifier activation time, the referral keys, the associated referral keys generation time, the received referral keys, and the reward.

The referral database table 702 shows a unique device identifier, an activation time for that specific unique device identifier, generated referral keys, and the generation time of those keys. The values are populated when a first user 124 of FIG. 1 registers the first removable media device 104 of FIG. 1, generates the referral keys 142 of FIG. 1, and sends out the referral keys 142 to friends, family or colleagues. For example, each of the four different ones of the referral keys 142 can be tracked in the referral database table 702.

Referring now to FIG. 8, therein is shown a second example of the referral database table 702. The referral database table 702 can be generated by the application, such as the first application 106 of FIG. 1 or the second application 122 of FIG. 1. The referral database table 702 can include entries of referral activities. The referral database table 702 can include columns for the recording of the unique device identifiers, the unique device identifier activation time, the referral keys, the associated referral keys generation time, the received referral keys, and the reward.

The referral database table 702 shows the fields of the same referral database table 702 with fields populated when the second user 126 of FIG. 1 registers the second removable media device 120 of FIG. 1. The referral database table 702 shows the fields of the same database table with the fields populated after the second user 126 enters the referral key 142 of FIG. 1 received from the first user 124 of FIG. 1. For example, the referral database table 702 shows the unique device identifier Activation Time of the Second Device T2 (May 12) with the Generation Time of Referral Key (1603-A01) by the First User T1 (May 11).

Figures 9, 10:
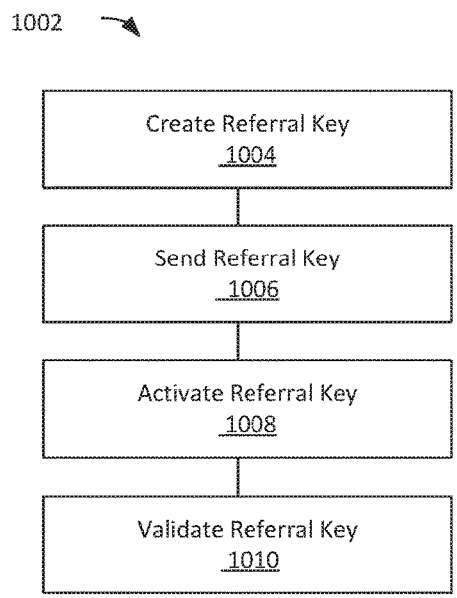
FIG. 9 depicts a third example of the referral database table.
FIG. 10 depicts an example of a referral process flow in accordance with one or more embodiments.

Referring now to FIG. 9, therein is shown third example of a database table 702. The exemplary table can be generated by an application on the referral server or the computing devices. The exemplary database table can include a recording of the unique device identifier, the unique device identifier, activation time, the generated referral keys, the associated referral keys generation time, the received referral keys, and the reward.

For example, the referral database table 702 shows a double-sided reward program where both parties are rewarded with an extension of license duration with a reward of one extra month of license validity.

In an illustrative example, the referral database table 702 and referral database table 702 can be stored at a licensing server or at a rewards management server that stores the unique device identifier of one of the removable media devices from where the referral was generated and the associated referral keys 142 of FIG. 1. In another example, the tables can be displayed to the first user and the second user for self-tracking of reports.

It has been discovered that the unique device identifier tracking tables can be stored on the system servers to prevent tampering and hacking by users, which improves the security and reliability of the referral device system.

2.1. Miscellaneous

The referral identity system 100 of FIG. 1 illustrates only one of many possible arrangements of components configured to provide the functionality described herein. Other arrangements may include fewer, additional, or different components, and the division of work between the components may vary depending on the arrangement. For example, in some embodiments, the license server 114 of FIG. 1 may be omitted, along with any other components relied upon exclusively by the omitted components. As another example, in an embodiment, system 100 may further include the referral server, the reward server 110 of FIG. 1, or other referral-based servers that rely on validating the referral key 142 to show a valid referral process.

These one or more computing devices comprise any combination of hardware and software configured to implement the various logical components described herein, including components such as the first computing device 102 of FIG. 1 or the second computing device 118 of FIG. 1. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components. It is understood that removable media device is used here as an example only and the same or other methods and systems can be used for any other network-connected hardware devices with integrated software applications to allow them to send a referral from the device and linking referral keys between devices and applications and for redeeming the referral rewards.

3.0. FUNCTIONAL OVERVIEW

Referring now to FIG. 10, therein is shown a referral process flow 1002 in accordance with one or more embodiments. The referral process flow 1002 can describe the process for validating a referral operation.

The referral process flow 1002 can be implemented in a variety of ways. For example, the referral process flow 1002 can include a create referral key module 1004, a send referral key module 1006, an activate referral key module 1008, a validate referral key module 1010, and an enable reward module 1012.

The create referral key module 1002 can initiate the referral process flow 1002. The first application 106 of FIG. 1 of the first removable media device 104 of FIG. 1 can create the referral key 142. The first referral key 142 can be calculated in a variety of ways. The referral key 142 of FIG. 1 can be a string of text, a number, or a cryptographically secure value to uniquely identify the referral key 142.

The send referral key module 1002 can send the referral key 142 to the referral server 150 of FIG. 1 along with the first unique device identifier 134 of FIG. 1 and the first referral time 202 of FIG. 2. The referral key 142 can also be transmitted to the second application 122 of FIG. 1 of the second removable media device 120.

The activate referral key module 1002 can be implemented by the second application 122. After receiving the referral key 142 from the first application 106, the second application 122 can request the referral operation by sending the referral key 142 received from the first application 106 to the referral server along with the second unique device identifier 136 and the request time, such as the second activation time 208.

The validate referral key module 1002 can compare the time of the referral key 142 and determine if they represent a valid referral request. The validate referral key module 1002 can receive the referral key 142 from the second application 122 of the second removable media device 120 of FIG. 1 and extract the second unique device identifier 136 of FIG. 1 and the second activation time 208 of FIG. 2.

The first referral time 202 of the first removable media device 104 can be compared to the second activation time 208 of the second removable media device 120.

The second user 126 of FIG. 1 can receive the referral key 142 from the first user 124 and send the referral key 142 with the second unique device identifier 136 and the second activation time 208 to the license server 114 of FIG. 1. If the referral key 142 is validated, then the license server 114 can send the license key 116 of FIG. 1 to the second application 122 which can then apply the license key 116 to the target application and allow it to execute according to the parameters of the license key 116.

If the first referral time 202 is less than the second activation time 208 then this indicates a valid referral operation was performed because the referral key 142 was generated before the second application 122 was activated. If the first referral time 202 is greater than the second activation time 208, then the referral key 142 was generated by the first user 124 of FIG. 1 after the second removable media device 120 was already activated and thus an improper referral was performed. Once the validity of the referral operation has been determined, the server can perform the appropriate action, such as issue the license key 116, issue a reward, or other actions.

In an embodiment, securing a referral from one user to another is greatly simplified by tying the referral key 142 to the hardware identifiers of the first unique device identifier 134 and the second unique device identifier 136. Requiring physical hardware reduces the risk of hacking by requiring the presence of the devices to validate the referral.

4.0. EXAMPLE EMBODIMENTS

Figure 11:
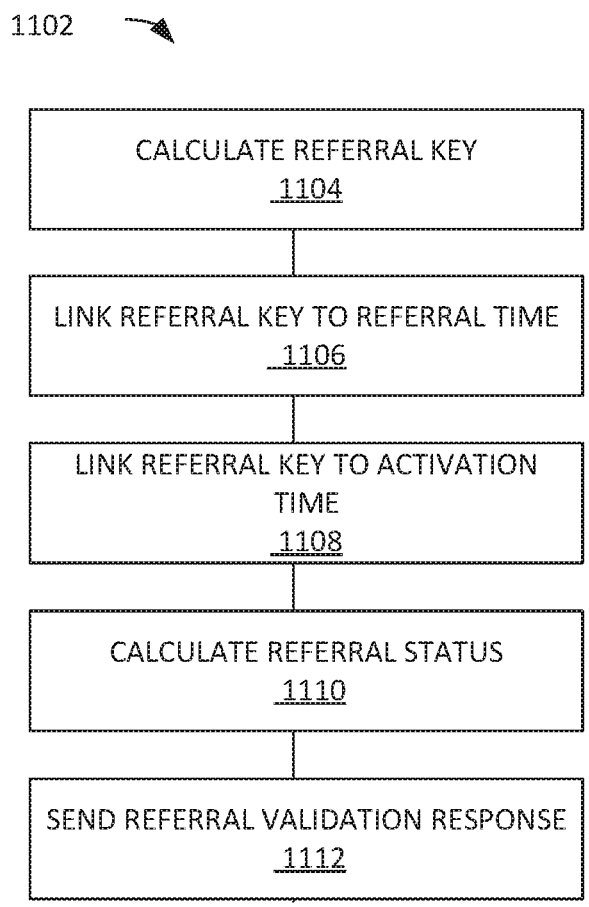
FIG. 11 depicts an example of. a process flow for the referral identity system in accordance with one or more embodiments.

Referring now to FIG. 11, therein is shown a process flow 1102 for the referral identity system in accordance with one or more embodiments. In some embodiments, the system 100 of FIG. 1 is performed though one or more computing devices or units.

Examples of some embodiments are represented, without limitation, in the following clauses:

In a block 1104, calculating a referral key for a referral operation;

In a block 1106, linking the referral key to a referral time and a first unique device identifier from a first network connected device;

In a block 1108, linking the referral key to an activation time and a second unique device identifier from a network connected device;

In a block 1110, calculating a referral status by comparing the referral time to the activation time;

In a block 1112, sending a referral validation response to the second removable media device based on the referral status.

In an embodiment, the system receives an input from a first user interface of the first application for determining the referral time.

In an embodiment, the system receives an input from a second user interface of the second application for determining the activation time.

In an embodiment, the system enters the referral key into a second user interface of the second application.

In an embodiment, the system sending the referral key from the first application coupled to the first network connected device to the second application coupled to the second network connected device and sending the referral key with the second unique device identifier and the activation time to a referral server.

In an embodiment, the system validates the referral status where the referral time is before the activation time.

In an embodiment, the system sends the referral validation response to the first network connected device.

In an embodiment, the system include a first network connected device having a first unique device identifier, a second network connected device having a second unique device identifier, a first application executing on the first network connected device, the first application linking a referral key to the first unique device identifier and a referral time, a second application executing on the second network connected device, the second application linking the referral key to the second unique device identifier and an activation time, and a referral server for receiving the first unique device identifier, the second unique device identifier, the referral time, and the activation time, the referral server calculating a referral status and sending a validation response to the second network connected device.

In an embodiment, the system includes the second application for receiving an input from a first user interface for determining the referral time.

In an embodiment, the system includes the second application for receiving an input from a second user interface for determining the activation time.

In an embodiment, the system includes the second application for receiving the referral key in a second user interface of the second network connected device.

In an embodiment, the system includes the first application for sending the referral key to the second application and the second application for sending the referral key with the second unique device identifier and the activation time to the referral server.

In an embodiment, the system includes the referral server for setting the referral status to valid when the referral time is before the activation time.

In an embodiment, the system includes the referral server for sending the referral validation response to the first network connected device.

In an embodiment, the system includes one or more non-transitory computer-readable media storing instruction that, when executed by one or more computing devices, cause: calculating a referral key for a referral operation, linking the referral key to a referral time and a first unique device identifier from a first network connected device, linking the referral key to an activation time and a second unique device identifier from a second network connected device, calculating a referral status by comparing the referral time to the activation time and sending a referral validation response to the second network connected device based on the referral status.

In an embodiment, the system receives an input from a first user interface of the first application for determining the referral time.

In an embodiment, the system receives an input from a second user interface of a second application for determining the activation time.

In an embodiment, the system enters the referral key into a second user interface of a second application.

In an embodiment, the system includes sending the referral key from a first application coupled to the first network connected device to a second application coupled to the second network connected device and sending the referral key with the second unique device identifier and the activation time to the referral server.

In an embodiment, the system validates the referral status where the referral time is before the activation time.

The referral identity system 100 can be implemented using the second network connected device 117 of FIG. 1 having the second computing device 118 of FIG. 1 and the second removable media device 120 of FIG. 1. The second network connected device 117 can store and execute the second application 122 of FIG. 1. The second network connected device 117 can have the second unique device identifier 136 of FIG. 1. The second network connected device 117 can link the referral key 142 of FIG. 1 to the second activation time 208 of FIG. 2 and the second unique device identifier 136.

The referral identity system 100 as described in one or more embodiments above can be implemented with the first network connected device 101 replacing the first computing device 102 and the first removable media device 104 and the second network connected device 117 replacing the second computing device 118 and the second removable media device 120.

In an illustrative example, the first network connected device 101 can be an intelligent thermostat device that is coupled to the network. Pressing a command referral button on the thermostat device can send a referral to the second network connected device 117 and the referral server 150 of FIG. 1.

5.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 12:
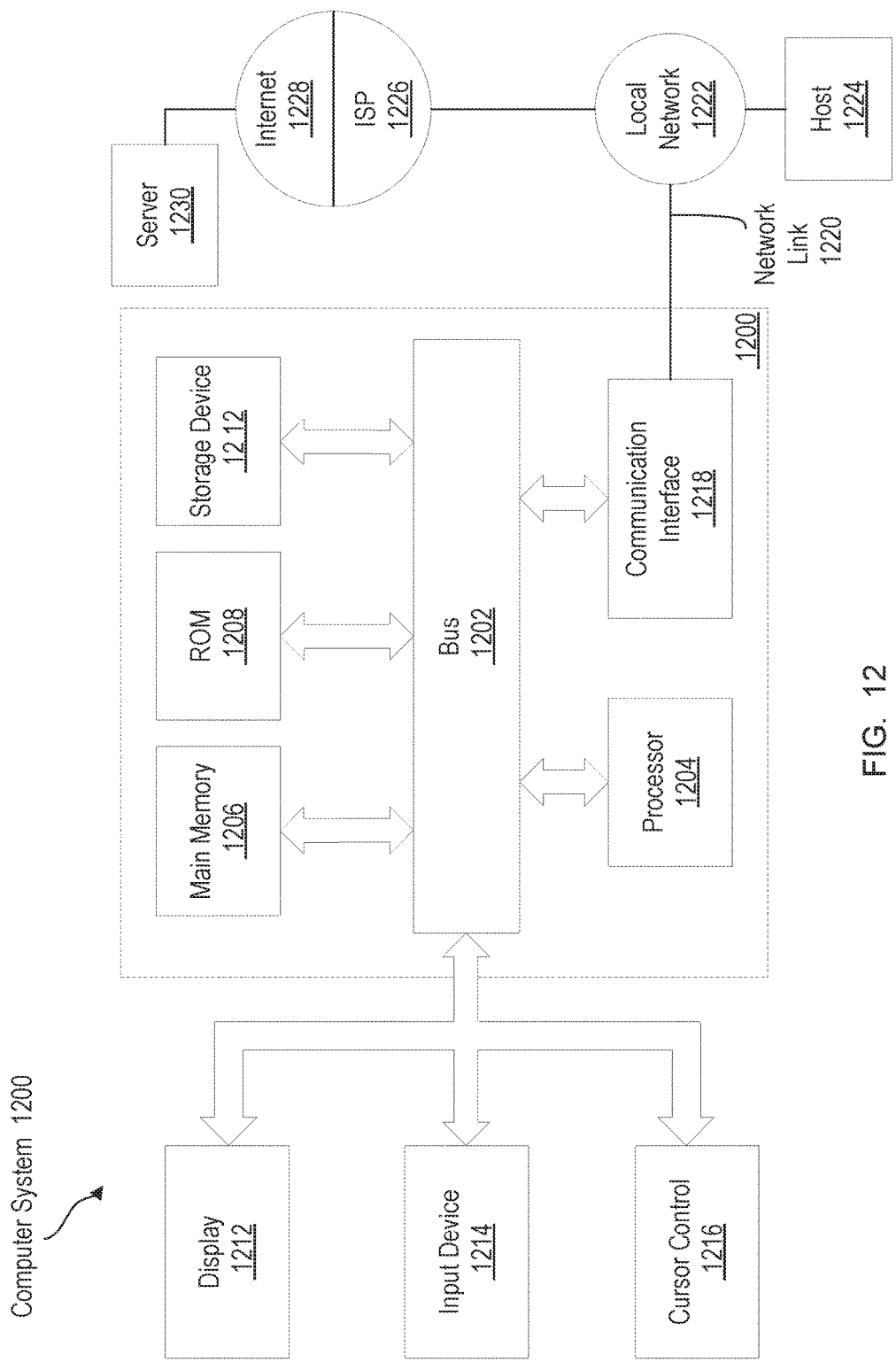
FIG. 12 is block diagram of a computer system upon which embodiments of the invention may be implemented.

Referring now to FIG. 12, therein is shown a block diagram that illustrates a computer system 1200 utilized in implementing the above-described techniques, according to an embodiment. Computer system 1200 may be, for example, a desktop computing device, laptop computing device, tablet, smartphone, server appliance, computing mainframe, multimedia device, handheld device, networking apparatus, or any other suitable device.

Computer system 1200 includes one or more busses 1202 or other communication mechanism for communicating information, and one or more hardware processors 1204 coupled with busses 1202 for processing information. Hardware processors 1204 may be, for example, a general purpose microprocessor. Busses 1202 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1200 also includes a main memory 1206, such as a random access memory (RAM) or other dynamic or volatile storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes one or more read only memories (ROM) 1208 or other static storage devices coupled to bus 1202 for storing static information and instructions for processor 1204. One or more storage devices 1210, such as a solid-state drive (SSD), magnetic disk, optical disk, or other suitable non-volatile storage device, is provided and coupled to bus 1202 for storing information and instructions.

Computer system 1200 may be coupled via bus 1202 to one or more displays 1212 for presenting information to a computer user. For instance, computer system 1200 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1212 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1212.

In an embodiment, output to display 1212 may be accelerated by one or more graphics processing unit (GPUs) in computer system 1200. A GPU may be, for example, a highly parallelized, multi-core floating point processing unit highly optimized to perform computing operations related to the display of graphics data, 3D data, and/or multimedia. In addition to computing image and/or video data directly for output to display 1212, a GPU may also be used to render imagery or other video data off-screen, and read that data back into a program for off-screen image processing with very high performance. Various other computing tasks may be off-loaded from the processor 1204 to the GPU.

One or more input devices 1214 are coupled to bus 1202 for communicating information and command selections to processor 1204. One example of an input device 1214 is a keyboard, including alphanumeric and other keys. Another type of user input device 1214 is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. Yet other examples of suitable input devices 1214 include a touch-screen panel affixed to a display 1212, cameras, microphones, accelerometers, motion detectors, and/or other sensors. In an embodiment, a network-based input device 1214 may be utilized. In such an embodiment, user input and/or other information or commands may be relayed via routers and/or switches on a Local Area Network (LAN) or other suitable shared network, or via a peer-to-peer network, from the input device 1214 to a network link 1220 on the computer system 1200.

A computer system 1200 may implement techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 1200 can receive the data on the network and demodulate the signal to decode the transmitted instructions. Appropriate circuitry can then place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

A computer system 1200 may also include, in an embodiment, one or more communication interfaces 1218 coupled to bus 1202. A communication interface 1218 provides a data communication coupling, typically two-way, to a network link 1220 that is connected to a local network 1222. For example, a communication interface 1218 may be an integrated services digital network (ISDN) card, cable modem, satellite modem, or a modem to provide a data communication connection to a corresponding type of telephone line. As another example, the one or more communication interfaces 1218 may include a local area network (LAN) card to provide a data communication connection to a compatible LAN. As yet another example, the one or more communication interfaces 1218 may include a wireless network interface controller, such as an 802.11-based controller, Bluetooth controller, Long Term Evolution (LTE) modem, and/or other types of wireless interfaces. In any such implementation, communication interface 1218 sends and receives electrical, electromagnetic, or optical signals that carry digital data streams representing various types of information.

Network link 1220 typically provides data communication through one or more networks to other data devices. For example, network link 1220 may provide a connection through local network 1222 to a host computer 1224 or to data equipment operated by a Service Provider 1226. Service Provider 1226, which may for example be an Internet Service Provider (ISP), in turn provides data communication services through a wide area network, such as the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

In an embodiment, computer system 1200 can send messages and receive data, including program code and/or other types of instructions, through the networks, network link 1220, and communication interface 1218. In the Internet example, a server 1230 might transmit a requested code for an application program through Internet 1228, ISP 1226, local network 1222 and communication interface 1218. The received code may be executed by hardware processors 1204 as it is received, and/or stored in storage device 1210, or other non-volatile storage for later execution. As another example, information received via a network link 1220 may be interpreted and/or processed by a software component of the computer system 1200, such as a web browser, application, or server, which in turn issues instructions based thereon to a hardware processor 1204, possibly via an operating system and/or other intermediate layers of software components.

In an embodiment, some or all of the systems described herein may be or comprise server computer systems, including one or more computer systems 1200 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claims dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of operation of a referral identity device system comprising:
   creating, by a first network-connected device at a referral time, a referral key for a referral operation;
   linking, by the first network-connected device, the referral key to the referral time and to a unique hardware device identifier of the first network-connected device;
   causing, after the linking, a transfer of the referral key from the first network-connected device to a second network-connected device and to a referral server;
   detecting, by the second network-connected device at an activation time, an activation of the referral key;
   additionally linking, by the second network-connected device, the referral key to the activation time and to a unique hardware device identifier of the second network-connected device;
   transmitting, after the additional linking, the referral key to the referral server for validation of the referral operation;
   calculating, by the referral server, a referral status of the referral operation by comparing the referral time in the referral key to the activation time in the referral key; and
   sending, by the referral server, a referral validation response to the second network-connected device based on the referral status of the referral operation.

2. The method as claimed in claim 1, wherein linking the referral key to the referral time further includes:
   receiving an input from a first user interface provided by the first network-connected device; and
   determining the referral time based on a time when the input was received.

3. The method as claimed in claim 1, wherein additionally linking the referral key to the activation time further includes:
   receiving a second input from a second user interface provided by the second network-connected device; and
   determining the activation time based on a time when the second input was received.

4. The method as claimed in claim 1, wherein causing a transfer of the referral key further includes:
   entering the referral key into a second user interface provided by the second network-connected device.

5. The method as claimed in claim 1, wherein causing a transfer of the referral key further includes:
   sending the referral key from the first network-connected device to network-connected device.

6. The method as claimed in claim 1, wherein the referral status is valid when the referral time is before the activation time, wherein the referral status is invalid when the referral time is not before the activation time.

7. The method as claimed claim 1, further comprising:
sending, by the referral server, the referral validation response to the first network-connected device.

8. A system comprising:
a first network-connected device having a unique hardware device identifier of the first network-connected device;
a second network-connected device having a unique hardware device identifier of the second network-connected device;
a first application executing on the first network-connected device, the first application providing a user interface for creating a referral key for a referral operation and linking the referral key to the unique hardware device identifier of the first network-connected device and a referral time based on a time when the referral key was created;
a second application executing on the second network-connected device, the second application providing a user interface for detecting an activation of the referral key at an activation time and additionally linking the referral key to the unique hardware device identifier of the second network-connected device and the activation time; and
a referral server for receiving the referral key, the referral server calculating a referral status of the referral operation by comparing the referral time in the referral key to the activation time in the referral key and sending a referral validation response with the referral status to the second network-connected device.

9. The system as claimed in claim 8, wherein the first application is for receiving an input from a first user interface provided by the first application and for determining the referral time based on a time when the input was received.

10. The system as claimed in claim 8, wherein the second application is for receiving a second input from a second user interface provided by the second application and for determining the activation time based on a time when the second input was received.

11. The system as claimed in claim 8, wherein the second application is for receiving the referral key in a second user interface provided by the second network-connected device.

12. The system as claimed in claim 8, wherein the first application is for sending the referral key to the second application.

13. The system as claimed in claim 8, wherein the referral server sets the referral status to valid when the referral time is before the activation time, wherein the referral server sets the referral status to invalid when the referral time is not before the activation time.

14. The system as claimed in claim 8, wherein the referral server is for sending the referral validation response to the first network-connected device.

15. One or more non-transitory computer-readable media storing instruction that, when executed by one or more computing devices, cause the one or more computing devices to execute operations comprising:
creating, by a first network-connected device at a referral time, a referral key for a referral operation;
linking, by the first network-connected device, the referral key to the referral time and to a unique hardware device identifier of the first network-connected device;
causing, after the linking, a transfer of the referral key from the first network-connected device to a second network-connected device and to a referral server;
additionally linking, by second network-connected device, the referral key to an activation time and to a unique hardware device identifier of the second network-connected device;
transmitting, after the additional linking, the referral key to a referral server for validation of the referral operation;
calculating, by the referral server, a referral status of the referral operation by comparing the referral time in the referral key to the activation time in the referral key; and
sending, by the referral server, a referral validation response to the second network-connected device based on the referral status of the referral operation.

16. The media as claimed in claim 15, wherein linking the referral key to the referral time further includes:
receiving an input from a first user interface provided by the first network-connected device; and
determining the referral time based on a time when the input was received.

17. The media as claimed in claim 15, wherein additionally linking the referral key to the activation time further includes:
receiving a second input from a second user interface provided by the second network-connected device; and
determining the activation time based on a time when the second input was received.

18. The media as claimed in claim 15, wherein causing a transfer of the referral key further includes:
entering the referral key into a second user interface provided by the second network-connected device.

19. The media as claimed in claim 15, wherein causing a transfer of the referral key further includes:
sending the referral key from the first network-connected device to the second network-connected device.

20. The media as claimed in claim 15, wherein the referral status is valid when the referral time is before the activation time, wherein the referral status is invalid when the referral time is not before the activation time.

* * * * *

UNITED STATES PATENT AND TRADEMARK OFFICE
CERTIFICATE OF CORRECTION

PATENT NO. : 10,154,020 B1
APPLICATION NO. : 15/206170
DATED : December 11, 2018
INVENTOR(S) : Bolotin et al.

Page 1 of 2

It is certified that error appears in the above-identified patent and that said Letters Patent is hereby corrected as shown below:

In the Drawings

Sheet 7 of 7, Fig. 12, reference numeral 1212, Line 2 (Second Occurrence), delete "1212" and insert --1210-- therefor In the Specification In Column 3, Line 22, delete "102" and insert --104-- therefor In Column 4, Line 3, delete "identify" and insert --identity-- therefor In Column 7, Line 66, delete "120," and insert --122,-- therefor In Column 10, Line 40, delete "104," and insert --102,-- therefor In Column 13, Line 29, delete "firsts" and insert --first-- therefor In Column 17, Line 7, delete "1002" and insert --1004-- therefor In Column 17, Line 13, delete "1002" and insert --1006-- therefor In Column 17, Line 19, delete "1002" and insert --1008-- therefor In Column 17, Line 27, delete "1002" and insert --1010-- therefor In Column 17, Line 30, delete "1002" and insert --1010-- therefor In Column 24, Line 2, delete "claims" and insert --claim-- therefor Signed and Sealed this
Tenth Day of March, 2020

Andrei Iancu
*Director of the United States Patent and Trademark Office*

CERTIFICATE OF CORRECTION (continued)
U.S. Pat. No. 10,154,020 B1

In the Claims

In Column 24, Line 67, in Claim 5, after "to", insert --the second--

In Column 25, Line 5, in Claim 7, after "claimed", insert --in--